(12) United States Patent
Albaugh et al.

(10) Patent No.: US 6,910,042 B2
(45) Date of Patent: Jun. 21, 2005

(54) SYSTEM AND METHOD FOR PARTIAL ORDERING SERVICE CAPABILITIES IN AN E-MARKETPLACE HUB

(75) Inventors: Virgil A. Albaugh, Austin, TX (US); Messaoud Benantar, Austin, TX (US); Philip Yen-tang Chang, Austin, TX (US); Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 10/159,481

(22) Filed: May 30, 2002

(65) Prior Publication Data

US 2003/0225727 A1 Dec. 4, 2003

(51) Int. Cl.⁷ .............................................. G06F 17/30
(52) U.S. Cl. ............................ 707/10; 707/6; 707/100; 709/203; 709/206
(58) Field of Search ............................ 707/6, 10, 100; 709/203, 206, 207

(56) References Cited

U.S. PATENT DOCUMENTS

| 6,021,495 A | | 2/2000 | Jain et al. .................... 713/210 |
|---|---|---|---|
| 6,108,688 A | * | 8/2000 | Nielsen ........................ 709/206 |
| 6,115,755 A | | 9/2000 | Krishan ........................ 709/201 |
| 6,192,396 B1 | * | 2/2001 | Kohler .......................... 709/206 |
| 6,308,238 B1 | | 10/2001 | Smith et al. ................. 710/310 |
| 6,336,119 B1 | | 1/2002 | Banavar et al. .......... 707/104.1 |
| 6,363,414 B1 | * | 3/2002 | Nicholls et al. ............. 709/206 |
| 6,363,415 B1 | * | 3/2002 | Finney et al. ............... 709/206 |
| 6,480,885 B1 | * | 11/2002 | Olivier ......................... 709/207 |
| 6,529,942 B1 | * | 3/2003 | Gilbert ......................... 709/206 |
| 6,643,687 B1 | * | 11/2003 | Dickie et al. ................ 709/206 |

* cited by examiner

*Primary Examiner*—Greta Robinson
*Assistant Examiner*—Cheryl Lewis
(74) *Attorney, Agent, or Firm*—VanLeeuwen & VanLeeuwen; Joseph T. VanLeeuwen; David A. Mims, Jr.

(57) ABSTRACT

A system and method for partial ordering service capabilities in an e-marketplace hub is presented. A recipient trading partner sets receive message constraints and a sending trading partner specifies sending message capabilities. The e-marketplace hub compares the receive message constraints with the sending message capabilities. If the sending message capabilities are a subset of the receive message constraints, the e-marketplace hub establishes a trading partner link between the sending trading partner and the recipient trading partner so the sending trading partner may send messages to the recipient trading partner. The e-marketplace hub may recursively compare sending message capabilities with receive message constraints at various levels to ensure a valid trading partner link.

27 Claims, 7 Drawing Sheets

SYSTEM AND METHOD FOR PARTIAL ORDERING SERVICE CAPABILITIES IN AN E-MARKETPLACE HUB

BACKGROUND OF THE INVENTION

1. Technical Field

The present invention relates in general to a system and method for partial ordering service capabilities in an e-marketplace hub. More particularly, the present invention relates to a system and method for forwarding a message when the message includes, at a minimum, constraints imposed by the message recipient.

2. Description of the Related Art

The benefits and the flexibility offered by Internet computing have led to the advent of electronic market places for businesses. Generally, electronic market places act as a hub that brokers business transactions between buyers, sellers, and various service providers. Business transactions may include purchase orders, requests for bids, invoices, or an agreed acknowledgement of a receipt. The complexity of electronic exchange definitions is increasing to enable trading partners to go beyond the simple exchange of documents. For example, trading partners may collaborate on additional subjects, such as supply chain management.

A user joins an e-marketplace hub by subscribing to various services that the hub offers. During the subscription process, the user configures his account and identifies a set of capabilities based upon the user's business practices. For example, a user may impose security properties for messages it receives. An instance of such a constraint would be the requirement by the recipient that it deals only with hub members that support message confidentiality (encrypted messages) during transport on open networks. Additionally, the user may identify a service level of a particular capability. Using the example described above, the user may require each received messages to be DES encrypted.

Once the user configures his account and becomes a new hub member, the user is able to establish trading partner links with other hub members. A challenge found with establishing trading partner links is that hub members pose constraints over potential trading partners that the hub has to verify prior to establishing a trading partner link. Using the example described above, the hub needs to ensure that only hub members supporting message confidentiality during transport on open networks be allowed to establish a transaction link with the new hub member. Otherwise, the message recipient may receive messages that are not encrypted which violate the message recipient's business practices.

Furthermore, a hub member may specify a constraint when in fact the hub member may support other capabilities. For example, a hub member may specify a DES security constraint for receiving messages when in fact the hub member has DES and RC4 security capabilities. What is needed, therefore, is a way for an e-marketplace hub to ensure that trading partner links may be established when a sending hub member has an equal to capability compared to a recipient's constraints imposed on the sending hub member.

SUMMARY

It has been discovered that analyzing a user's capabilities and constraints using a partially ordered set of entries allows an e-marketplace hub to ensure the establishment of valid trading partner links. The e-marketplace hub manages a list of capabilities and partner constraints which are organized according to a partially ordered technique. Each capability has a corresponding linearly ordered level number and a set of supported features. Hub members have a constraint list which includes constraints imposed on receiving messages. For example, a hub member may require receiving messages to be encrypted.

An initiator sends a request to the e-marketplace hub through a computer network, such as the Internet. If the request is to forward a message to a recipient hub member, the e-marketplace hub identifies the recipient and retrieves a list of trading partner links corresponding to the recipient. If an established trading partner link is established between the initiator and the recipient, the e-marketplace hub forwards the message to the recipient through a computer network, such as the Internet.

On the other hand, if an established trading partner link does not exist between the initiator and the recipient, the e-marketplace hub retrieves the recipient's constraints from a partner constraint list storage area and retrieves the initiator's capabilities from a member capabilities storage area. The e-marketplace hub performs a partial ordering comparison between the recipient's constraints and the initiator's capabilities to determine whether the initiator meets or exceeds the recipient's constraints. If the initiator meets or exceeds the recipient's constraints, the e-marketplace hub establishes a trading partner link and forwards the message to the recipient through a computer network, such as the Internet.

On the other hand, if the e-marketplace hub determines that the initiator is not capable of meeting or exceeding the recipient's constraints, the e-marketplace hub sends a return error to the initiator signifying that a trading partner link was not established and does not forward the message to the intended recipient. The initiator may decide to increase his capabilities in order to establish a trading partner link with the recipient in the future.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
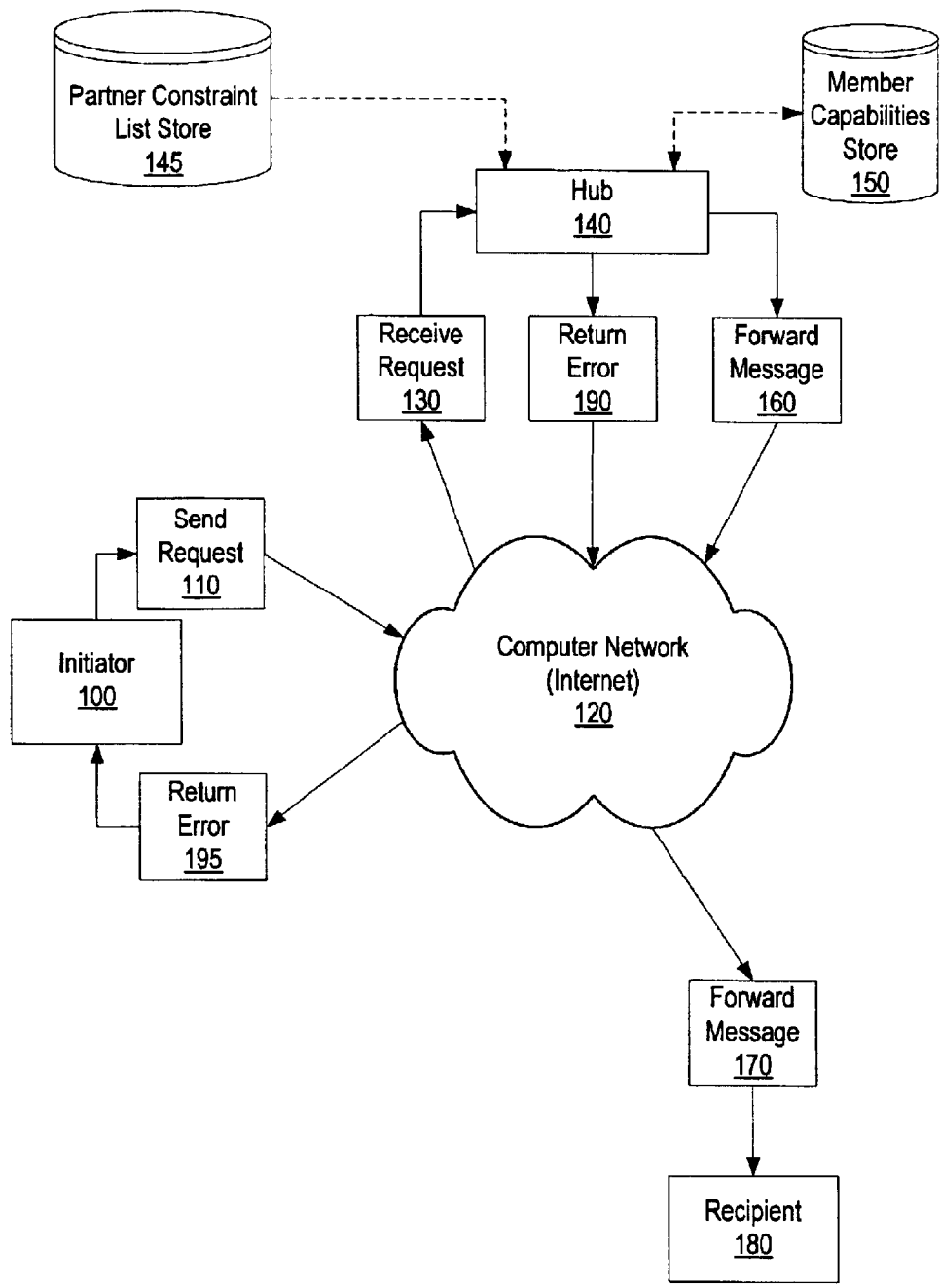
FIG. 1 is a high level diagram showing an initiator sending a message to a recipient through an e-marketplace hub.

FIG. 1 is a high level diagram showing an initiator sending a message to a recipient through an e-marketplace hub. Initiator 100 sends request 110 to hub 140 through computer network 120, such as the Internet. Hub 140 receives request 130 and identifies the type of request. Hub 140 may be an e-marketplace hub that forwards messages from initiators to recipients when recipient constraints are satisfied by the initiator. For example, a recipient may require that each message it receives to be encrypted in which hub 140 is responsible for ensuring that messages are not forwarded to the recipient unless they are encrypted.

Hub 140 identifies recipient 180 as an intended recipient of request 130. Hub 140 retrieves a list of trading partner links corresponding to recipient 180 from partner constraint list store 145 (refer to FIG. 6 and corresponding text for further details regarding trading partner link establishment). Partner constraint list store 145 may be stored on a non-volatile storage area, such as a computer hard drive. If hub 140 identifies an established trading partner link between initiator 100 and recipient 180, hub 140 sends forward message 160 to recipient 180 through computer network 120, such as the Internet. Recipient 180 receives and processes forward message 170.

On the other hand, if hub 140 does not identify an established trading partner link between initiator 100 and recipient 180, hub 140 retrieves recipient 180's constraints from partner constraint list store 145 and retrieves initiator 100's capabilities from member capabilities store 150. Hub 140 performs a partial ordering comparison between recipient 180's constraints and initiator 100's capabilities (see FIG. 6 and corresponding text for further detail regarding partial ordering comparison). If hub 140 determines a successful partial ordering comparison (i.e. initiator 100 meets or exceeds recipient 180's constraints), hub 140 establishes and stores a trading partner link in partner constraint list store 145. Hub 140 proceeds to send forward message 160 to recipient 180 through computer network 120, such as the Internet.

On the other hand, if hub 140 determines that initiator 100 is not capable of meeting or exceeding recipient 180's constraints, hub 140 does not establish a trading partner link and sends return error 190 to initiator 100 through computer network 120, such as the Internet. Initiator 100 receives and evaluates return error 195. During initiator 100's evaluation of return error 195, initiator 100 may decide to increase his capabilities in order to establish a trading partner link with recipient 180 in the future.

Figure 2:
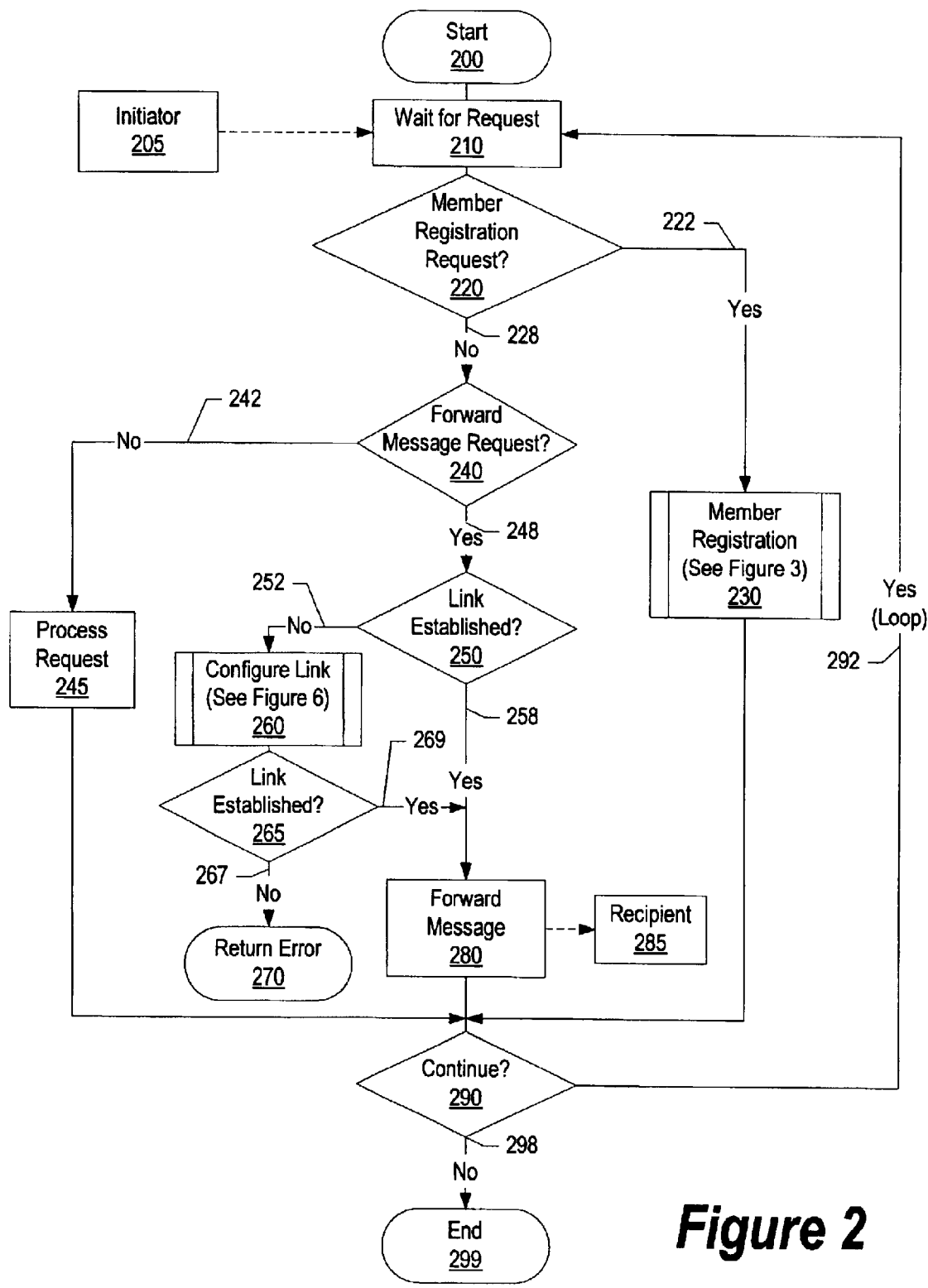
FIG. 2 is a high-level flowchart showing steps taken in processing an initiator's request.

FIG. 2 is a high-level flowchart showing steps taken in processing an initiator's request. Processing commences at 200, whereupon processing waits for a request from initiator 205 (step 210). When processing receives a request, a determination is made as to whether the request is a member registration request (decision 220). For example initiator 205 may send a request to be a new e-marketplace hub member. If the request is a member registration request, decision 220 branches to "Yes" branch 222 whereupon member registration is processed (pre-defined process block 230, see FIG. 3 and corresponding text for further details).

On the other hand, if the request is not a member registration request, decision 220 branches to "No" branch 228 whereupon a determination is made as to whether the request is a forward message request. For example, initiator 205 may be an existing hub member and wish to forward a message to a recipient. If the message is not a forward message request, decision 240 branches to "No" branch 242 whereupon the request is processed at step 245. For example, initiator 205 may send a request to receive a list of established hub members.

On the other hand, if the message is a forward message request, decision 240 branches to "Yes" branch 248 whereupon a determination is made as to whether an existing trading partner link is established between initiator 205 and the message recipient (decision 250). If there is an existing trading partner link established between initiator 205 and the message recipient, decision 250 branches to "Yes" branch 258 whereupon the message is forwarded to recipient 285 (step 280).

Figure 6:
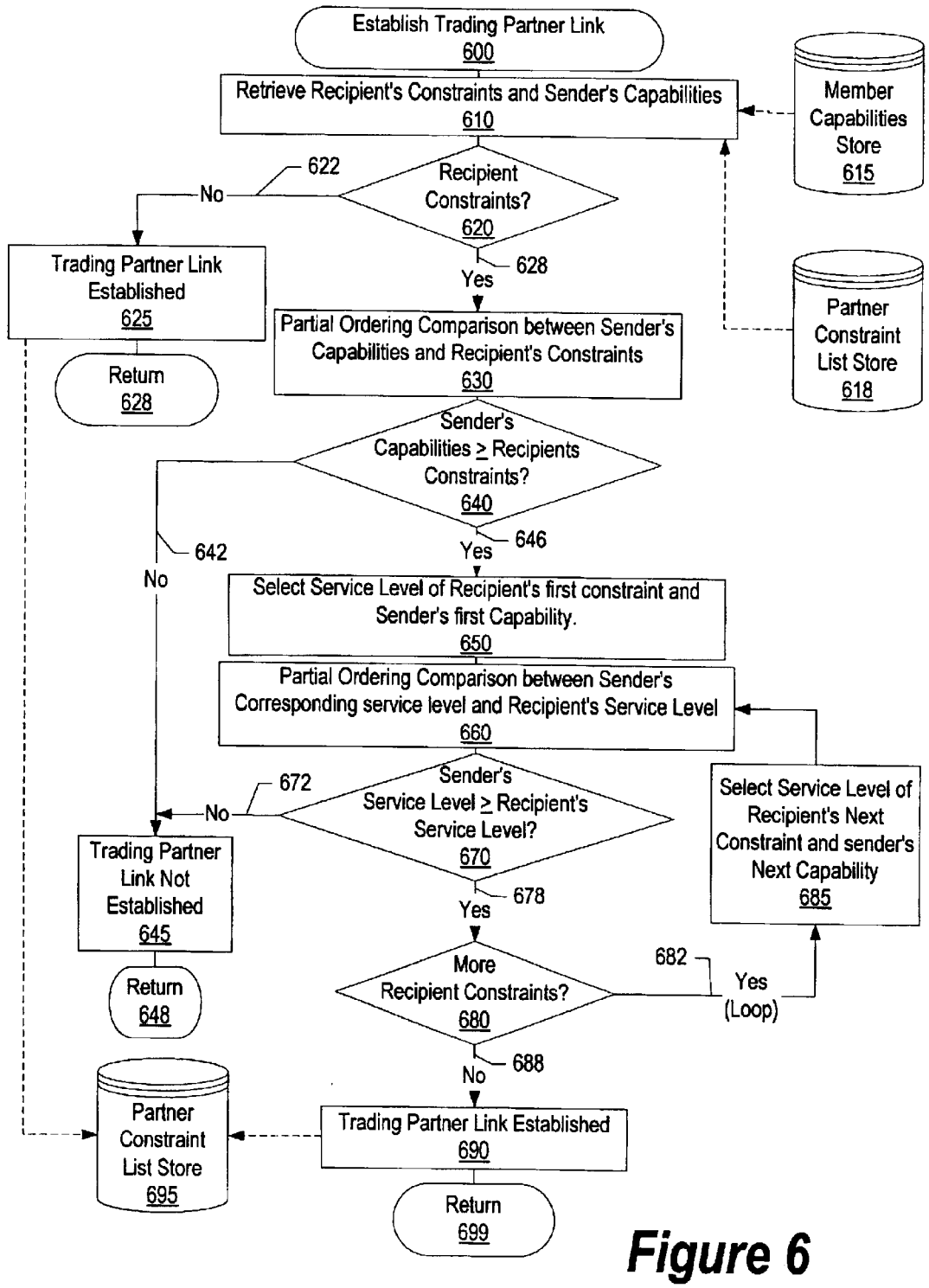
FIG. 6 is a flowchart showing steps taken in establishing a trading partner link between two hub members.

On the other hand, if a trading partner link is not established, decision 250 branches to "No" branch 252 whereupon a trading partner link is initiated (pre-defined process block 260, see FIG. 6 and corresponding text for further details). A determination is made as to whether a successful trading partner link was established (decision 265). If a successful trading partner link was established, decision 265 branches to "Yes" branch 269 whereupon the message is forwarded to recipient 285 (step 280). On the other hand, if a trading partner link was not established, decision 265 branches to "No" branch 267 whereupon an error is returned to initiator 205 at 270.

A determination is made as to whether to continue processing (decision 290). If processing is to continue, decision 290 branches to "Yes" branch 292 which loops back to wait for the next request. This looping continues until processing terminates, at which point decision 290 branches to "No" branch 298 and processing ends at 299.

Figure 3:
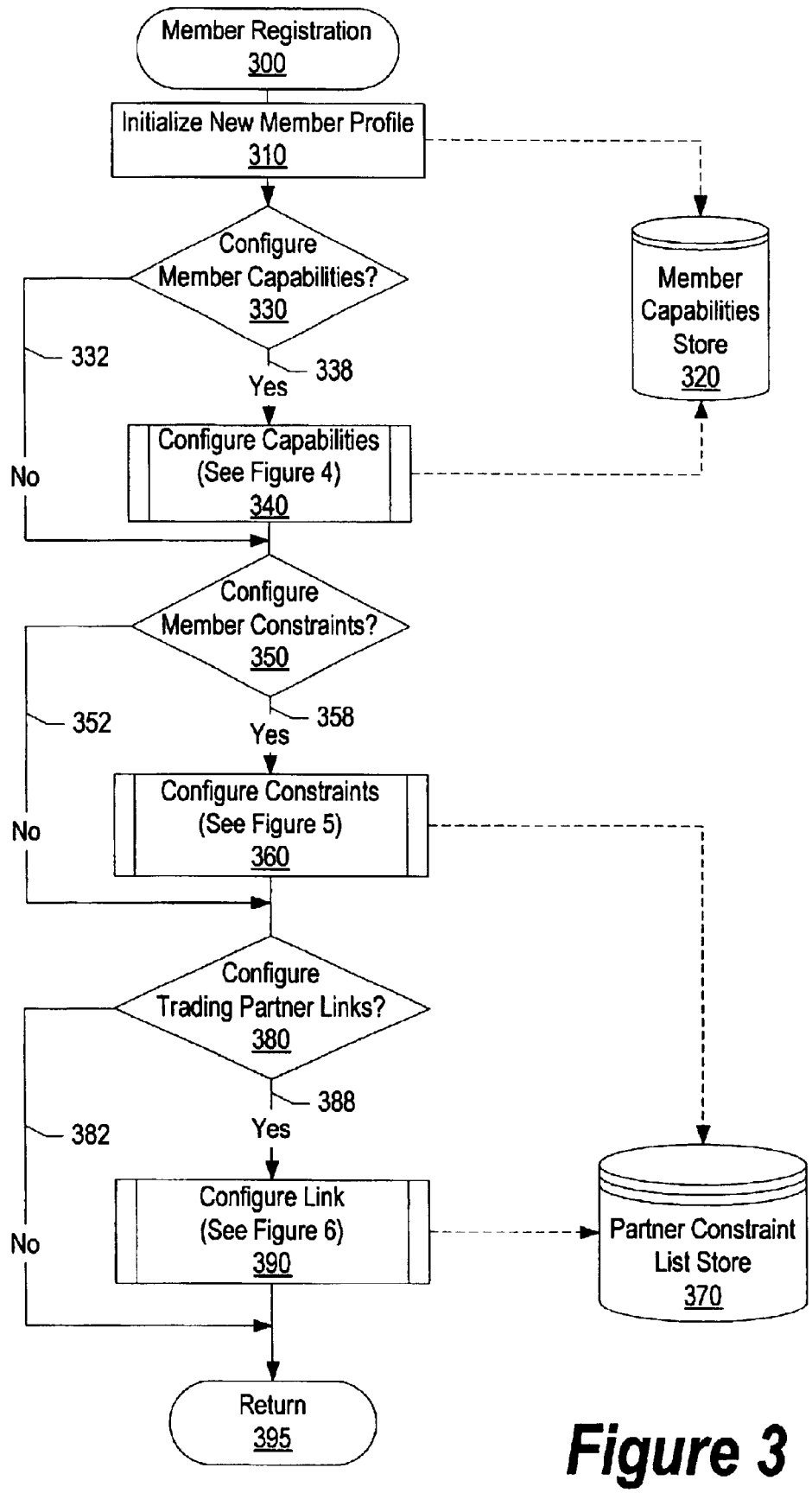
FIG. 3 is a flowchart showing steps taken in registering a hub member.

FIG. 3 is a flowchart showing steps taken in registering a hub member. Member registration processing commences at 300, whereupon a new hub member profile is initialized in member capabilities store 320 (step 310). For example, initializing the new hub member profile may include allocating storage space in member capabilities store 320 to store capabilities corresponding to the new hub member. Member capabilities store 320 may be stored on a non-volatile storage area, such as a computer hard drive.

A determination is made as to whether the new hub member wishes to configure his capabilities (decision 330). For example, the new hub member may wish to specify that he is capable of HTTP and SMTP transport protocols. If the new hub member chooses not to configure his capabilities, decision 330 branches to "No" branch 332 bypassing capability configuration steps. On the other hand, if the new hub member chooses to configure his capabilities, decision 330 branches to "Yes" branch 338 whereupon capability configuration processing takes place and the new hub member's capabilities are stored in member capabilities store 320 (pre-defined process block 340, see FIG. 4 and corresponding text for further details).

A determination is made as to whether to configure constraints imposed on messages the new hub member receives (decision 350). For example, the new hub member may require DES encryption on each message that the new hub member receives. If the new hub member chooses not to configure constraints at this time, decision 350 branches to "No" branch 352 bypassing constraint configuration steps. On the other hand, if the new hub member chooses to configure constraints, decision 350 branches to "Yes" branch 358 whereupon constraint configuration is processed and stored in partner constraint list store 370 (pre-defined process block 360, see FIG. 5 and corresponding text for further details). Partner constraint list store 370 may be stored on a non-volatile storage area, such as a computer hard drive.

A determination is made as to whether to configure a trading partner link (decision 380). If the new hub member chooses not to configure trading partner links at this time, decision 380 branches to "No" branch 382 bypassing trading partner link configuration steps. On the other hand, if the new hub member chooses to configure trading partner links, decision 380 branches to "Yes" branch 388 whereupon trading partner links are configured and stored in partner constraint list store 370 (pre-defined process block 390, see FIG. 6 and corresponding text for further details). Processing returns at 395.

Figure 4:
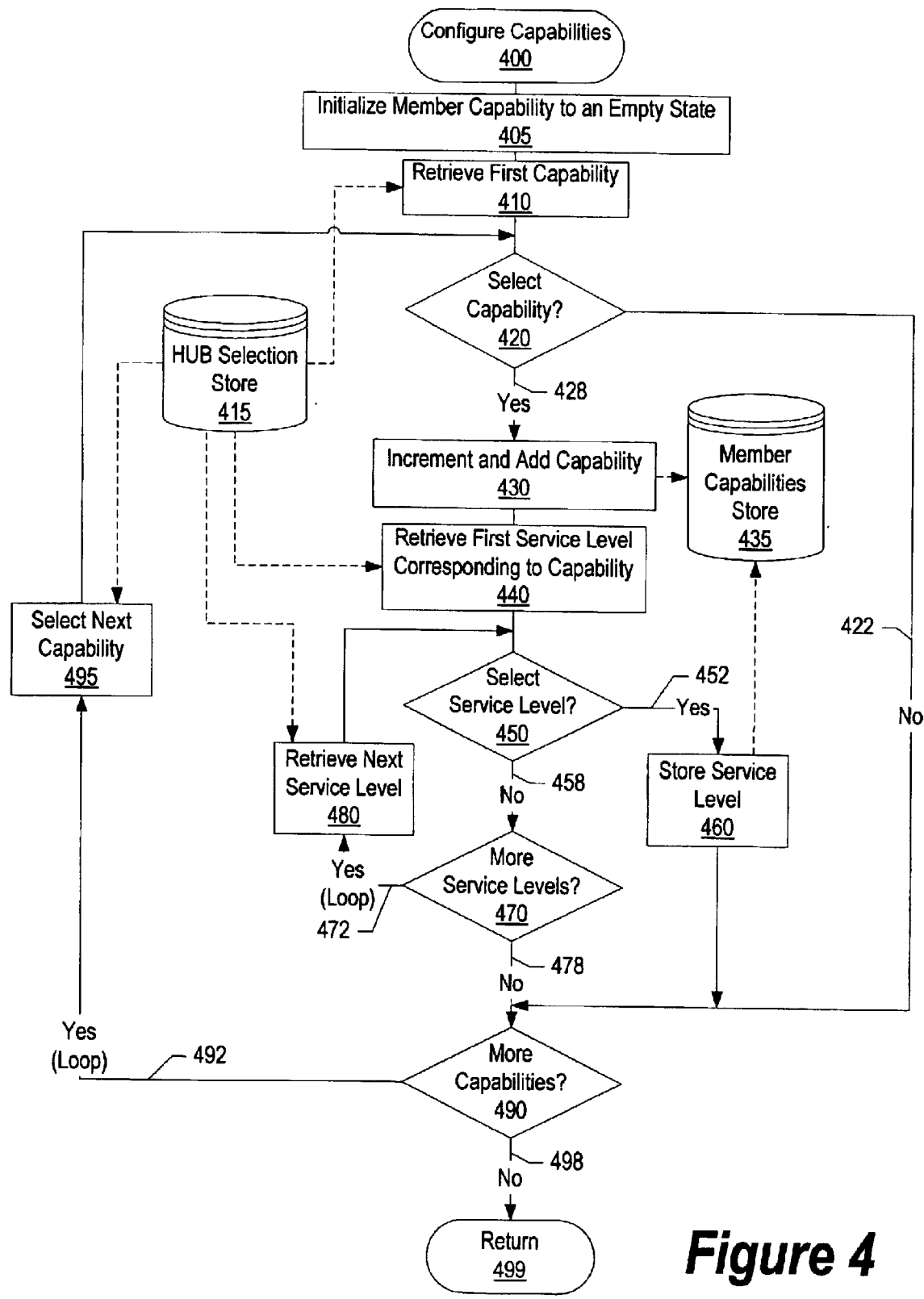
FIG. 4 is a flowchart showing steps taken in configuring a hub member's capabilities.

FIG. 4 is a flowchart showing steps taken in configuring a hub member's capabilities. Capability processing commences at 400, whereupon a hub member's capability is initialized to an empty state at step 405 (i.e. (0,{ })). A first capability is retrieved from hub selection store 415 (step 410). Hub selection store 415 includes a list of capabilities in order of dominance and may be stored on a non-volatile storage area, such as a computer hard drive. For example, hub selection store 415 may include TRANSPORT, SECURITY, and ACKNOWLEDGEMENT in a list that is organized in order of dominance. A determination is made as to whether the hub member wishes to select the first capability (decision 420). If the hub member chooses not to select the first capability, decision 420 branches to "No" branch 422 bypassing capability and corresponding service level storage steps.

On the other hand, if the hub member chooses to select the first capability, decision 420 branches to "Yes" branch 428 whereupon the hub member's capability is incremented by one and the corresponding capability is stored in member capabilities store 435 (step 430). Member capabilities store 435 may be stored on a non-volatile storage area, such as a computer hard drive. Using the example described above, the hub member may choose TRANSPORT as his first capability. A first service level corresponding to the selected capability is retrieved from hub selection store 415 at step 440. Service levels are also listed in order of dominance. Using the example described above, TRANSPORT may have corresponding service levels of HTTP and SMTP.

A determination is made as to whether to select the first service level (decision 450). If the user chooses to select the corresponding service level, decision 450 branches to "Yes" branch 452 whereupon the corresponding service level is stored in member capabilities store 435 (step 460). On the other hand, if the user chooses to select a higher service level corresponding to the selected capability, decision 450 branches to "No" branch 458 whereupon a determination is made as to whether there are more service levels corresponding to the selected capability (decision 470).

If there are more service levels corresponding to the selected capability, decision 470 branches to "Yes" branch 472 which loops back to retrieve (step 480) and process the next service level. This looping continues until there are no more service levels corresponding to the selected capability, at which point decision 470 branches to "No" branch 478. When the hub member selects a particular service level, the selected service level along with each service level lower in dominance is stored in member capabilities store 435. In one embodiment, the minimum service level may be stored in the corresponding hub member's profile if the hub member does not chooses a service level.

A determination is made as to whether there are more capabilities in hub selection store 415 for the hub member to choose (decision 490). Using the example described above, SECURITY may be the next capability to process. If there are more capabilities for the hub member to choose, decision 490 branches to "Yes" branch 492 which loops back to select (step 495) and process the next capability. This looping continues until there are no more capabilities in hub selection store 415 for the hub member to select, at which point decision 490 branches to "No" branch 498. Processing returns at 499.

In one embodiment, the hub member may have the ability to choose more layers of service levels. Using the example described above, the user may be able to select different service levels of HTTP.

In another embodiment, a hub member may select each capability prior to selecting a service level for each corresponding capability. For example, the hub member may select TRANSPORT, SECURITY, and ACKNOWLEDGEMENT as capabilities and then select service levels for each capability, such as selecting HTTP and SMTP for the TRANSPORT capability.

Figure 5:
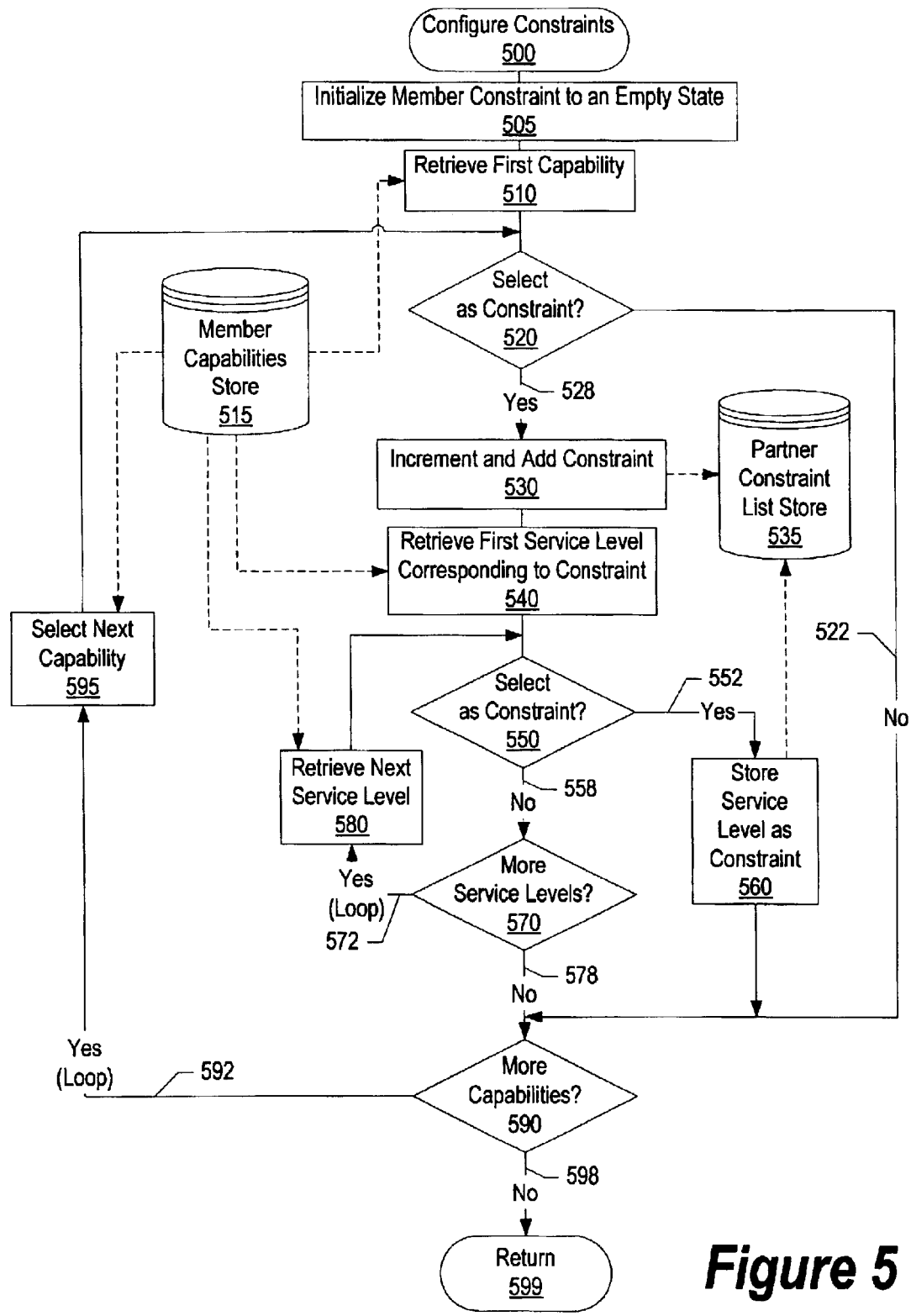
FIG. 5 is a flowchart showing steps taken in configuring a hub member's constraints.

FIG. 5 is a flowchart showing steps taken in configuring a hub member's constraints. Constraint configuration processing commences at 500, whereupon a hub member's constraint is initialized to an empty state at step 505 (i.e. (0,{ })). A first capability is retrieved from member capabilities store 515 (step 510). Member capabilities store 515 includes each hub member's capabilities and may be stored on a non-volatile storage area, such as a computer hard drive. For example, a hub member may include TRANSPORT, SECURITY, and ACKNOWLEDGEMENT as his capabilities. In one embodiment, a hub member may require constraints that are not included in his capabilities.

A determination is made as to whether the hub member wishes to select the first capability as a constraint to impose on a receiving message (decision 520). If the hub member chooses not to select the first capability to impose on a receiving message, decision 520 branches to "No" branch 522 bypassing constraint and corresponding service level storage steps.

On the other hand, if the hub member chooses to select the first capability to impose on a receiving message, decision 520 branches to "Yes" branch 528 whereupon the hub member's constraint is incremented (i.e. 1) and the corresponding constraint is stored in partner constraint list store 535 (step 530). Partner constraint list store 535 may be stored on a non-volatile storage area, such as a computer hard drive. Using the example described above, the hub member may choose TRANSPORT as the first constraint. A first service level corresponding to the selected capability is retrieved from member capabilities store 515 at step 540. Using the example described above, TRANSPORT may have corresponding service levels of HTTP and SMTP in which HTTP is the first selected service level.

A determination is made as to whether to select the corresponding service level as a constraint to impose on a receiving message (decision 550). If the user chooses to select the corresponding service level as a constraint to impose on a receiving message, decision 550 branches to "Yes" branch 552 whereupon the corresponding service level is stored as a constraint in partner constraint list store 535 (step 560). On the other hand, if the user chooses to select a higher service level corresponding to the selected capability to impose on receiving messages, decision 550 branches to "No" branch 558 whereupon a determination is made as to whether there are more service levels corresponding to the selected constraint (decision 570).

If there are more service levels corresponding to the selected constraint, decision 570 branches to "Yes" branch 572 which loops back to retrieve (step 580) and process the next service level. This looping continues until there are no more service levels corresponding to the selected constraint, at which point decision 570 branches to "No" branch 578. In one embodiment, the minimum service level may be stored in the corresponding hub member's profile if the hub member does not chooses a service level.

A determination is made as to whether there are more capabilities in member capabilities store 515 for the hub member to select as a constraint (decision 590). Using the example described above, SECURITY may be the next capability to select as a constraint. If there are more capabilities for the hub member to select as a constraint, decision 590 branches to "Yes" branch 592 which loops back to select (step 595) and process the next capability. This looping continues until there are no more capabilities in member capabilities store 515 for the user to select as a constraint, at which point decision 590 branches to "No" branch 598. Processing returns at 599.

In one embodiment, the hub member may have the ability to choose more layers of service level constraints. Using the example described above, the user may be able to select different service level constraints of HTTP.

In another embodiment, a hub member may select each constraint prior to selecting a service level constraint for each corresponding constraint. For example, the hub member may select TRANSPORT, and SECURITY as constraints and then select service level constraints for each constraint, such as selecting HTTP for the TRANSPORT constraint.

FIG. 6 is a flowchart showing steps taken in establishing a trading partner link between two hub members. Processing commences at 600, whereupon a recipient's constraints are retrieved from partner constraint list store 618 and a sender's capabilities are retrieved from member capabilities store 615 (step 610). Member capabilities store 615 and partner constraint list store 618 may be stored on a non-volatile storage area, such as a computer hard drive.

A determination is made as to whether the recipient has imposed constraints on receiving messages (decision 620). If the recipient has not imposed constraints, decision 620 branches to "No" branch 622 whereupon a trading partner link is established between the sender and recipient and stored in partner constraint list store 695 (step 625). Processing returns at 628.

In one embodiment, a sender may impose constraints upon a recipient in which processing analyzes the capabilities of the original recipient with the constraints imposed by the original sender. For example, a sender may require an acknowledgement corresponding to a message in which processing analyzes the capabilities of the recipient to validate that the recipient is capable of sending an acknowledgement. Once this is validated, a trading partner link is established.

On the other hand, if the recipient has imposed constraints on receiving messages, decision 620 branches to 628. In one embodiment, the recipient may impose different constraints on receiving messages based upon the sender's identity. For example, the recipient may have a list of confidential vendors in which the recipient requires each message to be secure and a list of other vendors in which the recipient does not require each message to be secure.

A partial ordering comparison is performed between the sender's capabilities and the recipient's constraints at step 630. For example one partner may require a hub member sending him messages to use HTTP as a transport and apply SECURITY (encryption using the DES algorithm) to the messages. The sender may support HTTP and SMTP for message transport, SECURITY with DES and RC4 encryption algorithms, and expects to receive an ACKNOWLEDGMENT from the recipient. The capabilities of the sender are compared against the constraints of the recipient as follows:

Sender Capability=(3, {TRANSPORT, SECURITY, ACKNOWLEDGMENT}) where TRANSPORT=(2, {HTTP, SMTP}) and SECURITY=(2, {DES, RC4})

Similarly the recipient imposes:

Recipient Constraint=(2, {TRANSPORT, SECURITY}) where TRANSPORT=(1, {HTTP}) and SECURITY= (1, {DES}).

A determination is made as to whether the sender's capabilities are greater than or equal to the recipient's constraints (decision 640). If the sender's capabilities are not greater than or equal to the recipient's constraints, decision 640 branches to "No" branch 642 whereupon a trading partner link is not established (step 645) and processing returns at 648. On the other hand, if the sender's capabilities are greater than or equal to the recipient's constraints, decision 640 branches to "Yes" branch 646. Using the example described above, the set of constraints imposed by the recipient {TRANSPORT, SECURITY} is a subset of capabilities supported by the sender {TRANSPORT, SECURITY, ACKNOWLEDGMENT}. Therefore, the sender's capabilities are greater than the recipient's constraints.

Processing selects the service level of the recipient's first constraint at step 650. A partial ordering comparison is performed between the recipient's first constraint service level and the sender's corresponding service level (step 660). A determination is made as to whether the sender's service level is greater than or equal to the recipient's service level (decision 670). If the sender's service level is not greater than or equal to the recipient's service level, decision 670 branches to "No" branch 672 whereupon a trading partner link is not established (step 645) and processing returns at 648. On the other hand, if the sender's service level is greater than or equal to the recipient's service level, decision 670 branches to "Yes" branch 678.

Using the example described above, the sender's transport capability is (2, {HTTP, SMTP}) while that of the recipient is (1, {HTTP}). Since {HTTP} is a subset of {HTTP, SMTP}, the transport capability is partially ordered along a dominance relationship. Meaning, the service level of the sender's capabilities is greater than the service level of the recipient's constraints and the set of features in the sender's capabilities is a superset of the set of features in the recipient's constraints.

A determination is made as to whether the recipient has more constraints to perform a partial ordering comparison (decision 680). Using the example described above, SECURITY is another constraint in which to perform a partial ordering comparison. If the recipient has more constraints to perform a partial ordering comparison, decision 680 branches to "Yes" branch 682 which loops back to retrieve (step 685) and process the service level corresponding to the next recipient constraint. This looping continues until there are no more recipient constraints to perform a partial ordering comparison, at which point decision 680 branches to "No" branch 688 whereupon a trading partner link is established between the sender and recipient (step 690). Processing returns at 699.

In one embodiment, processing may analyze more than one layer of service levels. Using the example described above, processing may analyze different service level constraints of HTTP.

Figure 7:
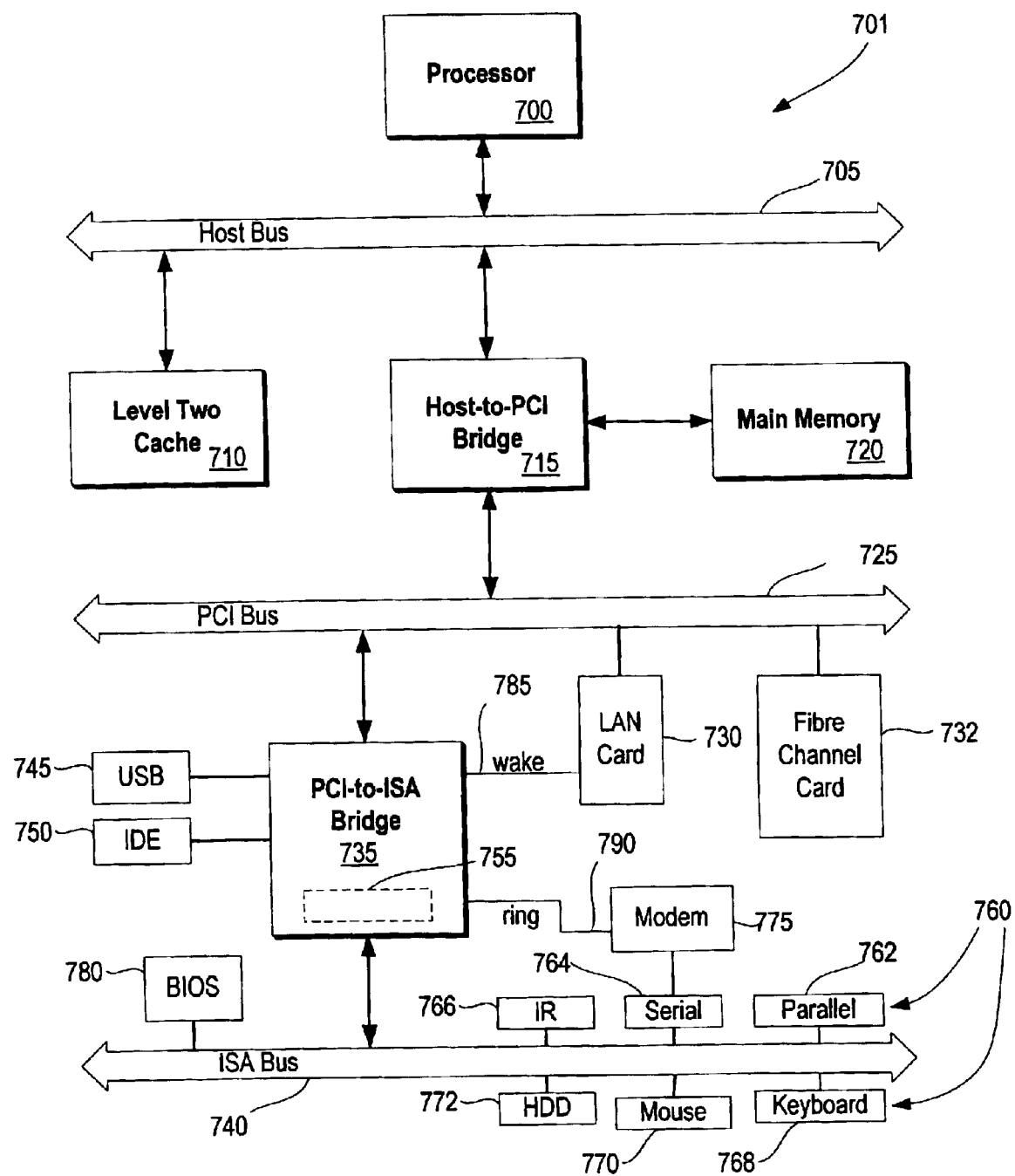
FIG. 7 is a block diagram of an information handling system capable of implementing the present invention.

FIG. 7 illustrates information handling system 701 which is a simplified example of a computer system capable of performing the invention described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (HDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of handling electronic messages, said method comprising:

receiving one of the messages from a sending trading partner, the message including a message recipient identifier, the message recipient identifier corresponding to a recipient trading partner;

retrieving one or more recipient constraints corresponding to the message recipient identifier;

identifying one or more sender capabilities corresponding to the sending trading partner;

comparing the sender capabilities with the recipient constraints;

determining whether one or more sender capabilities matches the recipient constraints in response to the comparing; and sending the message to the recipient trading partner in response to the determination.

2. The method as described in claim 1 wherein the comparing further comprises:

selecting one of the recipient constraints from the recipient constraints;

identifying a first constraint service level corresponding to the selected recipient constraint;

comparing the first constraint service level to a first capability service level that corresponds to the sender capability that matches the selected recipient constraint; and wherein the determining further comprises:

determining whether the first capability service level matches the first constraint service level.

3. The method as described in claim 1 further comprising:

setting a trading partner link flag in response to the determination.

4. The method as described in claim 3 further comprising:
registering a second message;
determining whether the trading partner link flag is set;
forwarding the second message to the trading partner in response to the determination; and
performing the retrieving, identifying, comparing, determining, and sending in response to the determination.

5. The method as described in claim 1 further comprising:
retrieving a capability;
deciding whether to add the capability to the sender capabilities;
incrementing a capability level value in response to the deciding; and
adding the capability to the senders capability in response to the deciding.

6. The method as described in claim 5 further comprising:
retrieving a service level corresponding to the capability;
resolving whether to add the service level to the sender capabilities;
incrementing a service level value in response to the resolving; and
adding the service level to the senders capabilities in response to the resolving.

7. The method as described in claim 1 further comprising:
retrieving a constraint;
deciding whether to add the constraint to the recipient constraints;
incrementing a constraint level value in response to the deciding; and
adding the constraint to the recipient constraints in response to the deciding.

8. The method as described in claim 7 further comprising:
retrieving a service level corresponding to the constraint;
resolving whether to add the service level to the recipient constraints;
incrementing a service level value in response to the resolving; and
adding the service level to the recipient constraints in response to the resolving.

9. The method as described in claim 1 further comprising:
performing the retrieving, identifying, comparing, and determining prior to receiving one of the messages;
setting a pre-configured link flag wherein the establishing is in response to the determination;
receiving one of the messages;
analyzing the pre-configured link flag; and
performing the sending in response to the analyzing.

10. An information handling system comprising:
one or more processors;
a memory accessible by the processors;
one or more nonvolatile storage devices accessible by the processors;
a message handling tool to handle messages, the message handling tool including:
 means for receiving one of the messages from a sending trading partner, the message including a message recipient identifier, the message recipient identifier corresponding to a recipient trading partner;
 means for retrieving one or more recipient constraints corresponding to the message recipient identifier;
 means for identifying one or more sender capabilities corresponding to the sending trading partner;
 means for comparing the sender capabilities with the recipient constraints;
 means for determining whether one or more sender capabilities matches the recipient constraints in response to the comparing; and
 means for sending the message to the recipient trading partner in response to the determination.

11. The information handling system as described in claim 10 wherein the means for comparing further comprises:
means for selecting one of the recipient constraints from the recipient constraints;
means for identifying a first constraint service level corresponding to the selected recipient constraint;
means for comparing the first constraint service level to a first capability service level that corresponds to the sender capability that matches the selected recipient constraint; and
wherein the means for determining further comprises:
 means for determining whether the first capability service level matches the first constraint service level.

12. The information handling system as described in claim 10 further comprising:
means for setting a trading partner link flag in response to the determination.

13. The information handling system as described in claim 12 further comprising:
means for registering a second message;
means for determining whether the trading partner link flag is set;
means for forwarding the second message to the trading partner in response to the determination; and
means for performing the retrieving, identifying, comparing, determining, and sending in response to the determination.

14. The information handling system as described in claim 10 further comprising:
means for retrieving a capability;
means for deciding whether to add the capability to the sender capabilities;
means for incrementing a capability level value in response to the deciding; and
means for adding the capability to the senders capability in response to the deciding.

15. The information handling system as described in claim 14 further comprising:
means for retrieving a service level corresponding to the capability;
means for resolving whether to add the service level to the sender capabilities;
means for incrementing a service level value in response to the resolving; and
means for adding the service level to the senders capabilities in response to the resolving.

16. The information handling system as described in claim 10 further comprising:
means for retrieving a constraint;
means for deciding whether to add the constraint to the recipient constraints;
means for incrementing a constraint level value in response to the deciding; and
means for adding the constraint to the recipient constraints in response to the deciding.

17. The information handling system as described in claim 16 further comprising:
  means for retrieving a service level corresponding to the constraint;
  means for resolving whether to add the service level to the recipient constraints;
  means for incrementing a service level value in response to the resolving; and
  means for adding the service level to the recipient constraints in response to the resolving.

18. The information handling system as described in claim 10 further comprising:
  means for performing the retrieving, identifying, comparing, and determining prior to receiving one of the messages;
  means for setting a pre-configured link flag wherein the establishing is in response to the determination;
  means for receiving one of the messages;
  means for analyzing the pre-configured link flag; and
  means for performing the sending in response to the analyzing.

19. A computer program product stored in a computer operable media for handling messages, said computer program product comprising:
  means for receiving one of the messages from a sending trading partner, the message including a message recipient identifier, the message recipient identifier corresponding to a recipient trading partner;
  means for retrieving one or more recipient constraints corresponding to the message recipient identifier;
  means for identifying one or more sender capabilities corresponding to the sending trading partner;
  means for comparing the sender capabilities with the recipient constraints;
  means for determining whether one or more sender capabilities matches the recipient constraints in response to the comparing; and
  means for sending the message to the recipient trading partner in response to the determination.

20. The computer program product as described in claim 19 wherein the means for comparing further comprises:
  means for selecting one of the recipient constraints from the recipient constraints;
  means for identifying a first constraint service level corresponding to the selected recipient constraint;
  means for comparing the first constraint service level to a first capability service level that corresponds to the sender capability that matches the selected recipient constraint; and
  wherein the means for determining further comprises:
    means for determining whether the first capability service level matches the first constraint service level.

21. The computer program product as described in claim 19 further comprising:
  means for setting a trading partner link flag in response to the determination.

22. The computer program product as described in claim 21 further comprising:
  means for registering a second message;
  means for determining whether the trading partner link flag is set;
  means for forwarding the second message to the trading partner in response to the determination; and
  means for performing the retrieving, identifying, comparing, determining, and sending in response to the determination.

23. The computer program product as described in claim 19 further comprising:
  means for retrieving a capability;
  means for deciding whether to add the capability to the sender capabilities;
  means for incrementing a capability level value in response to the deciding; and
  means for adding the capability to the senders capability in response to the deciding.

24. The computer program product as described in claim 23 further comprising:
  means for retrieving a service level corresponding to the capability;
  means for resolving whether to add the service level to the sender capabilities;
  means for incrementing a service level value in response to the resolving; and
  means for adding the service level to the senders capabilities in response to the resolving.

25. The computer program product as described in claim 19 further comprising:
  means for retrieving a constraint;
  means for deciding whether to add the constraint to the recipient constraints;
  means for incrementing a constraint level value in response to the deciding; and
  means for adding the constraint to the recipient constraints in response to the deciding.

26. The computer program product as described in claim 25 further comprising:
  means for retrieving a service level corresponding to the constraint;
  means for resolving whether to add the service level to the recipient constraints;
  means for incrementing a service level value in response to the resolving; and
  means for adding the service level to the recipient constraints in response to the resolving.

27. The computer program product as described in claim 19 further comprising:
  means for performing the retrieving, identifying, comparing, and determining prior to receiving one of the messages;
  means for setting a pre-configured link flag wherein the establishing is in response to the determination;
  means for receiving one of the messages;
  means for analyzing the pre-configured link flag; and
  means for performing the sending in response to the analyzing.

* * * * *